July 15, 1941.   E. HARTMANN ET AL   2,249,131
METHOD OF AND APPARATUS FOR TESTING RECEIVERS
Filed March 18, 1939

INVENTORS: E. HARTMANN
L. E. KREBS
BY
*T. M. Campbell*
ATTORNEY

Patented July 15, 1941

2,249,131

UNITED STATES PATENT OFFICE 2,249,131

METHOD OF AND APPARATUS FOR TESTING RECEIVERS

Erhard Hartmann, New York, N. Y., and Luther E. Krebs, West Orange, N. J., assignors to Bell Telephone Laboratories, Incorporated, New York, N. Y., a corporation of New York Application March 18, 1939, Serial No. 262,678

7 Claims. (Cl. 179—107)

This invention relates to a method of and means for measuring the frequency response characteristic of bone conduction receivers.

To intelligently manufacture and inspect bone conduction receivers it is necessary to determine whether or not their response characteristics are what they are designed to be. In order to properly ascertain these characteristics it is essential that the receivers be made to work into a mechanical load having substantially the same mechanical impedance components as those of the average human mastoid. No other kind of load will give a true representation of the response characteristic comparable to that obtained when in actual use. It is only when response tests are made with the receiver on a human mastoid or upon an artificial mastoid with similar impedance components that it is known just what the receiver's response will be when it is worn by its prospective user.

It is therefore the object of this invention to provide an apparatus for and a method of test whereby the frequency response characteristics of bone conduction receivers may be obtained under conditions closely simulating actual service.

The foregoing object is attained by providing a method of test and an apparatus whereby the response of the receiver is measured while its input is supplied with a range of audio frequencies from a variable frequency source and its output is made to work into a complex impedance load substantially equivalent to that of the average human mastoid.

The invention is more particularly described in the following specification which may be more fully understood by referring to the drawing in which.

Figure 1:
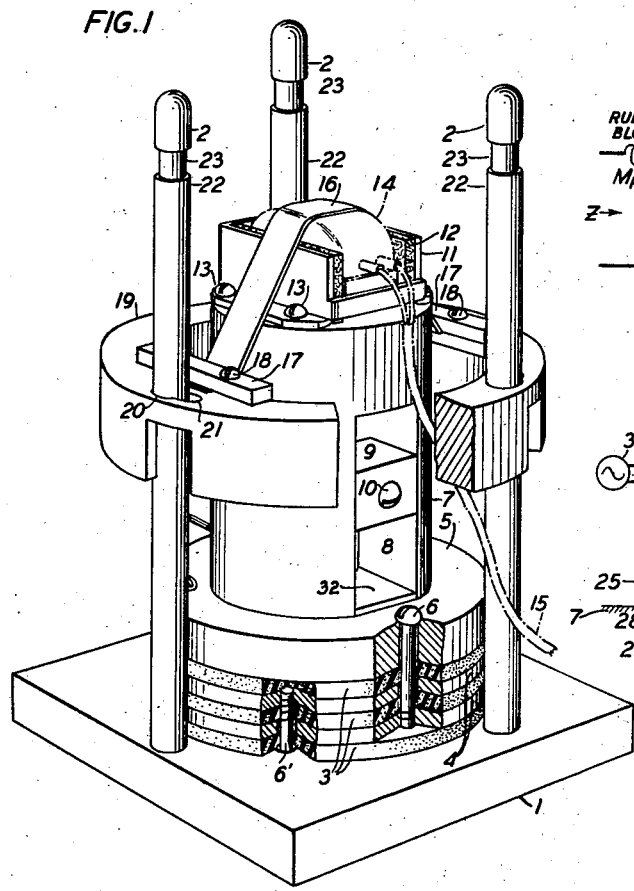
Fig. 1 is an assembly view of a preferred embodiment.

In Fig. 1 the complex impedance load hereinafter called an artificial mastoid is mounted on a metal base plate 1 having three vertical guides 2—2—2 rigidly attached thereto at points corresponding to the vertices of an equilateral triangle. Upon the top surface of plate 1 and between guides 2—2—2 a series of sponge rubber discs 3 and metal plates 4 are alternately arranged in a vertical stack or "sandwich." A cylindrical metallic column 7 having a metal base 5 is set upon this stack and the entire assembly secured by screws 6 threaded into the lower of the two metal plates 4 and similar screws 6' through the under-side of base plate 1 threaded into the upper of the two metal plates 4. Column 7 has a cavity 8 adapted to receive the pick-up device 27, more particularly described in connection with Fig. 4. A block 9 is sweated to the side walls of cavity 8 and is tapped to receive an adjustment screw 10. The top of column 7 is flat to take a guide 11 attached thereto by screws 13 and adapted to accurately position the receiver 14 which is to be tested. The flat top of column 7 also supports the rubber block 24 also more particularly described in connection with Fig. 4. The inner side walls of guide 11 are faced with a felt lining 12 to mechanically insulate the vibrating receiver from guide 11 and to damp the latter against vibration. The inner face of this felt lining loosely engages receiver 14. Conductors 15 connect the coils of receiver 14 to an audio frequency source 33 indicated schematically in Fig. 2.

Receiver 14 is held down by an annular weight 19 acting through a rubber band 16 which is clamped to the weight by means of bars 17 and screws 18. Weight 19 slides freely on guides 2 which extend therethrough via slots 20. The latter each contain a reduced section 21 which cooperates with a complementary reduced section 23 on the upper end of each guide 2 to release the weight from the receiver and to relieve band 16 when not in use.

Figure 2:
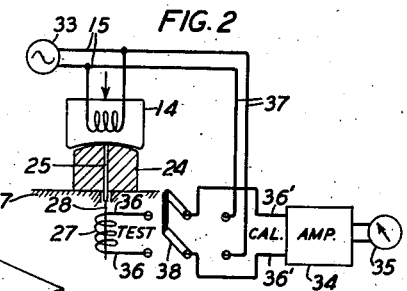
Fig. 2 is a schematic of the entire combination.

The schematic of the entire combination is disclosed in Fig. 2 wherein the input of receiver 14 is connected to a variable source of audio frequency 33 via conductors 15. A rubber block 24 is inserted between the receiver and the top of column 7 and constitutes most of the artificial mastoid load. A light weight rod 25 mechanically connects the receiver to the pick-up stylus 26 of a reproducer 27, the output of which is amplified by amplifier 34 and indicated by a meter 35. A calibrating circuit 37 may be provided to furnish a means for maintaining a known relationship between the receiver input and the sensitivity of the measuring apparatus 34, 35. Switch 36 is provided for conveniently changing from the calibrating to the testing circuits.

Figure 3:
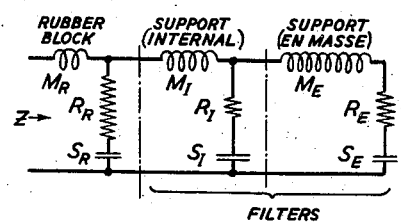
Fig. 3 is a schematic of the electrical equivalent of the complex impedance load into which the receiver is made to work.

The theoretical nature of the above described artificial mastoid as well as its operation is quite complex but it is believed that it can be easily understood by referring to Fig. 3 in which Z represents the complex impedance load into which the receiver is caused to work. The meshes are similar in structure but differ in relative magnitudes. The first mesh is composed of the mechanical mass $M_R$, resistance $R_R$ and stiffness $S_R$ of the rubber block 24. This mesh constitutes the principal load into which the receiver works although the other two meshes have their effects and are of appreciable magnitudes. The second and third meshes entitled "support (internal)" and "support (en masse)" act primarily as high-pass and low-pass filters respectively, strongly attenuating any tendency to pass audio frequencies of the order used in the test. Column 7 is the support and is so designed as to be free of natural resonances within the test frequency range.

The second mesh is composed of the mechanical mass $M_I$, effective resistance $R_I$ and stiffness $S_I$ of the metallic column 7 mounted on absorbing discs 3 vibrating internally along its vertical axis. It is evident that the resonant frequency of this metallic body is very high in the audio frequency scale and is designed to be substantially above the upper end of the test frequency range whereby the receiver 14 and the block 24 are effectively protected from disturbances in the test frequency range whether those disturbances tend to arise internally or externally.

The third mesh is composed of mass $M_E$, resistance $R_E$ and stiffness $S_E$ of the column 7 vibrating en masse along its vertical axis on the alternate layer of metal and rubber discs 3 and 4, the rubber discs 3 taking practically all the deformation. Here it is evident that the resonant frequency is very low in the audio scale thereby providing a further filtering action against disturbances in the test frequency range. Also the high magnitude of resistance $R_E$ effectively damps en masse motion.

Figure 4:
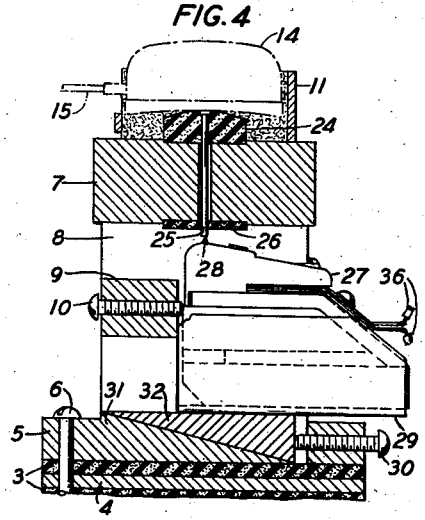
Fig. 4 is a section of the apparatus of Fig. 1 showing in detail the receiver support and the pick-up means.

A section disclosing in more detail the physical relation of some of the parts is shown in Fig. 4. Rubber block 24 is cemented to the top surface of column 7, the latter being a very large mass relative to that of receiver 14. A light weight rod 25 preferably of aluminum extends vertically through an aperture in column 7 and is tightly fitted at its upper end in a vertical hole in block 24 and at its lower end by a tight fit in a thin rubber disc 26 cemented to the roof of cavity 8. A pick-up device 27 is supported in a U-shaped holder 29 and inserted into the lower end of cavity 8 with the stylus 28 thereof on top. A wedge 31 integral with base 5 forms the bottom of cavity 8 and a similar but loose wedge 32 is interposed between the under-side of holder 29 and wedge 31. An adjustment screw 30 cooperates with wedge 32 to raise or lower stylus 28 while screw 10 adjusts its horizontal position. It is evident that by adjusting screws 10 and 30 stylus 28 may be brought into operative contact with aluminum rod 25.

It is essential that the force urging the receiver 14 against block 24 be substantially free of all mass and inertia effects. That is to say it should be a practically pure force, independent of frequency and of constant magnitude. The very light mass of rubber band 16 supplies the necessary qualities to this end. The magnitude of this force is substantially that produced by the average head-band. It should be borne in mind that the compliance of rubber block 24 causes the contact area between it and receiver 14 to increase when weight 19 is applied through rubber band 16. This is necessary to obtain the desired impedance components from block 24. It has been found that upon properly proportioning a selected rubber composition for block 24 and mounting the same on column 7 these components can be made very nearly identical to those of the average human mastoid. These proportions vary with the rubber selected. However, it has been found that a cylindrical block of reclaimed rubber capable of relatively high hysteresis losses and large enough to prevent permanent deformation satisfactorily answers the purpose. The relative size and approximate shape is substantially that shown in Fig. 4.

In one practical embodiment, the parts were proportioned approximately as follows: support 7 was made to have a mass of about 1¼ kilograms, the three rubber discs 3 were made of ⅛ inch thick sponge rubber sheets and 3 inches in diameter, brass discs 4 were also made ⅛ inch thick and 3 inches in diameter and the cylindrical rubber block 24 was made from some reclaimed rubber stock, the final dimensions being ¾ inch diameter, about ¼ inch high and the crown having a radius of about 1½ inches. These dimensions for the cylindrical rubber block 24 may have to be varied considerably with different lots of rubber stock and should be proportioned to present to the receiver a stiffness of about $200 \times 10^6$ dynes per centimeter an effective mass of about ½ gram and a resistance of about 10,000 mechanical ohms.

Figure 5:
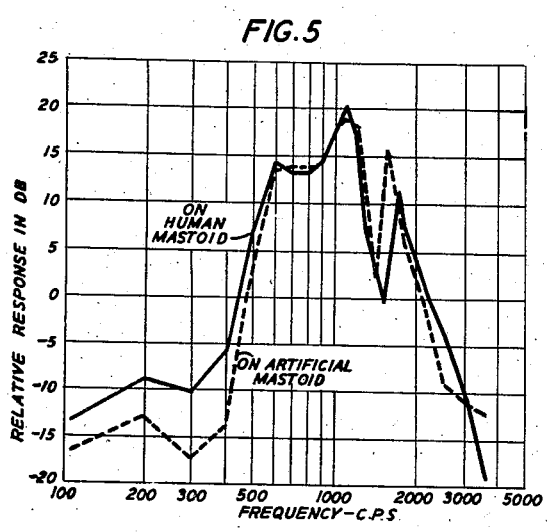
Fig. 5 is a graphic representation of the characteristics of a typical bone conduction receiver.

An actual comparison between the observed characteristics of a typical bone conduction receiver working first into a particular human mastoid and then working into the artificial mastoid of this invention is disclosed in Fig. 5. The comparison is strikingly close and it has been found that the characteristics measured on various human mastoids fit quite closely around the characteristics obtained on the artificial mastoid, indicating that the artificial mastoid of this invention has substantially the same impedance components as the average human mastoid.

In using the apparatus of this invention the receiver is placed in guide 11 and weight 19 is lowered on guides 2 until it is supported by band 16 whereby the receiver is urged against the load impedance by a substantially pure force. Conductors 15 are connected between receiver 14 and variable frequency source 33. Pick-up stylus 28 is adjusted by means of screws 10 and 30 into operative relation with aluminum rod 25, the upper end of which is in contact with the receiver 14. Amplifier 34 with indicator 35 is connected to pick-up 27 via conductors 36, 36'. The frequency of audio frequency oscillator 33 is then varied in as many steps as desired throughout the utilizable frequency spectrum which is from about 300 cycles per second to about 3000 cycles per second. The response of the receiver in decibels is indicated by meter 35 and when plotted as a function of frequency is a graphic representation of the frequency response characteristic similar to Fig. 5. Should it be thought desirable, it is obvious that variable frequency source 33 may furnish a rapidly changing frequency known as a "warble-tone" whereupon indicator 35 will indicate an integrated response of receiver 14.

While the invention has been described in terms of a particular organization of apparatus, a novel method of test has also been disclosed for measuring the response of bone conduction receivers which is independent of the specific structural embodiment herein disclosed.

What is claimed is:

1. An apparatus for measuring the frequency response characteristic of a bone conduction receiver comprising in combination a complex mechanical impedance load substantially equal to that of the average human mastoid, means for applying said load to said receiver, a variable frequency source adapted to apply a range of audio frequencies to said receiver, and a pick-up means adapted to measure the response of said receiver throughout said frequency range.

2. In an apparatus for measuring the frequency response characteristic of a bone conduction receiver, a complex mechanical impedance load therefor comprising essentially a body of material so proportioned as to have substantially the same impedance components as the average human mastoid, and means for applying said load to said receiver.

3. In an apparatus for measuring the frequency response characteristic of a bone conduction receiver, a complex mechanical impedance load therefor comprising essentially a body of material so proportioned as to have substantially the same impedance components as the average human mastoid, and means for applying said load to said receiver, said means comprising a substantially pure force urging said receiver against said load.

4. An apparatus for measuring the frequency response characteristic of a bone conduction receiver comprising a complex mechanical load the impedance of which is substantially equal to that presented by the average human mastoid, means for urging said receiver against said load and a pick-up means coupled to said receiver whereby the response thereof may be observed.

5. In an apparatus for measuring the frequency response characteristic of a bone conduction receiver, an artificial mastoid comprising essentially a body of elastic material so proportioned that when subjected to a substantially pure force of predetermined magnitude the mechanical mass, stiffness and resistance components thereof are substantially equal to those of the average human mastoid.

6. In an apparatus for measuring the frequency response characteristic of a bone conduction receiver, an artificial mastoid comprising a plurality of parts having different mechanical masses, stiffnesses and resistances so proportioned as to present to said receiver an impedance having components substantially equal to those of the average human mastoid.

7. A method of measuring the frequency response characteristic of a bone conduction receiver comprising applying thereto a complex mechanical impedance load substantially equal to that of the human mastoid, then supplying an input to said receiver comprising a successive series of frequencies covering the entire utilizable audio frequency range, and measuring the magnitude of the response of said receiver throughout said range.

ERHARD HARTMANN.
LUTHER E. KREBS.